United States Patent
Ariga et al.

(10) Patent No.: US 8,986,869 B2
(45) Date of Patent: Mar. 24, 2015

(54) SECONDARY BATTERY AND METHOD OF PREPARING THE SAME

(75) Inventors: Toshiyuki Ariga, Hitachinaka (JP); Takashi Sasaki, Hiratsuka (JP)

(73) Assignee: Hitachi Automotive Systems, Ltd., Hitachinaka-shi, Ibaraki (JP)

( * ) Notice: Subject to any disclaimer, the term of this patent is extended or adjusted under 35 U.S.C. 154(b) by 108 days.

(21) Appl. No.: 13/818,276

(22) PCT Filed: Sep. 29, 2010

(86) PCT No.: PCT/JP2010/066970
§ 371 (c)(1),
(2), (4) Date: Feb. 21, 2013

(87) PCT Pub. No.: WO2012/042612
PCT Pub. Date: Apr. 5, 2012

(65) Prior Publication Data
US 2013/0157095 A1    Jun. 20, 2013

(51) Int. Cl.
*H01M 4/00* (2006.01)
*H01M 10/04* (2006.01)
*H01M 2/26* (2006.01)
*H01M 2/30* (2006.01)

(52) U.S. Cl.
CPC .......... *H01M 10/0431* (2013.01); *H01M 2/263* (2013.01); *H01M 2/30* (2013.01)
USPC .......................................................... 429/94

(58) Field of Classification Search
CPC . Y02E 60/122; Y02E 60/12; H01M 10/0431; H01M 2/263; H01M 2/30
USPC ........................................................... 429/94
See application file for complete search history.

(56) References Cited

U.S. PATENT DOCUMENTS

| 7,348,099 B2 * | 3/2008 | Mukai et al. | 429/185 |
| 2007/0059596 A1 * | 3/2007 | Mukai et al. | 429/185 |
| 2010/0112434 A1 * | 5/2010 | Akou et al. | 429/174 |
| 2010/0143773 A1 * | 6/2010 | Honbou | 429/94 |

FOREIGN PATENT DOCUMENTS

| JP | 2002-158029 A | 5/2002 |
| JP | 2012-134157 A | 5/2002 |
| JP | 4061938 B2 | 3/2008 |
| JP | 2009-48962 A | 3/2009 |

* cited by examiner

*Primary Examiner* — Stewart Fraser
(74) *Attorney, Agent, or Firm* — Volpe and Koenig, P.C.

(57) ABSTRACT

A shaft core includes a positive electrode shaft core portion having a positive electrode splaying portion at one end, a negative electrode shaft core portion having a negative electrode splaying portion at the other end, and an insulation portion that mutually insulates and integrates the positive and negative electrode shaft core portions. The positive electrode plate is electrically connected to the positive electrode collector in a state of being splayed through the positive electrode splaying portion, and the negative electrode plate is electrically connected to the negative electrode collector being splayed through the negative electrode splaying portion. The positive and negative electrode shaft core splaying portions press and open their respective electrode laminates at the end surfaces of the wound electrode group, the positive electrode connection piece and the positive electrode collecting portion are welded, and the negative electrode connection piece and the negative electrode collecting portion are also welded.

8 Claims, 18 Drawing Sheets

(a)

(b)

(a)

(b)

SECONDARY BATTERY AND METHOD OF PREPARING THE SAME

TECHNICAL FIELD

The present invention relates to a typical secondary battery represented by a square lithium ion secondary battery whose cross-sectional shape is formed as a rectangular shape, a round-cornered rectangular shape, or the like and a method of preparing the same.

BACKGROUND ART

Thus far, a square battery has been known as a battery that can provide a larger volume density than a cylindrical battery. A square battery accommodates a flat wound electrode group formed by stacking a band-like positive electrode and a band-like negative electrode through a separator and winding them in a square battery chassis, and an electrolytic solution is injected into the battery chassis.

The square battery has respective uncoated portions of the positive electrode and the negative electrode protruding at both end portions of the flat wound electrode group in the winding axis direction, and allows an electrode terminal or a collector to be connected to the uncoated portions, thereby minimizing the conducting path so as to reduce connection resistance and increase the output. In addition, the above configuration is effective for making the battery compact.

Regarding the connection aspect between the flat wound electrode group and the collector, for example, a storage element of PTL 1 has been proposed.

In the storage element described in PTL 1, plate-like sheet connection portions are inserted inward from the end surfaces of the uncoated portions protruding from the flat wound electrode group so as to connect both portions.

CITATION LIST

Patent Literature

PTL 1: Japanese Patent No. 4061938

SUMMARY OF INVENTION

Technical Problem

In the storage element of PTL 1, when the sheet-shaped connection portions are inserted into both end uncoated winding inner circumferential portions present at the end portions of the flat wound electrode group in the axis direction, there are cases in which metal foil is folded or deformed, the winding center location of a splaying foil deviates, or some of the sheet-shaped connection portion is bitten into while being inserted. Therefore, it is necessary to carefully carry out an insertion operation of the sheet-shaped connection portion into the end surface of the flat wound electrode group so as to prevent the metal foil from being damaged, and there is a demand for improvement of workability.

Solution to Problem (1) A secondary battery according to the invention of claim 1 includes a wound electrode group configured by winding a positive electrode plate and a negative electrode plate through a separator on the outer circumferential portion of a shaft core, a vessel which accommodates the wound electrode group, has the inside sealed with a lid, and is provided with a positive electrode external terminal and a negative electrode external terminal on the external surface, a positive electrode collector that electrically connects the positive electrode plate to the positive electrode external terminal, a negative electrode collector that electrically connects the negative electrode plate to the negative electrode external terminal, a positive electrode splaying portion and a negative electrode splaying portion that press and splay a laminate of the positive electrode plates and a laminate of the negative electrode plates from inside at both end surfaces of the wound electrode group, in which the shaft core includes a positive electrode shaft core portion provided with the positive electrode splaying portion at one end, a negative electrode shaft core portion provided with the negative electrode splaying portion at the other end, and an insulation portion that mutually insulates and integrates the positive electrode shaft core portion and the negative electrode shaft core portion, the positive electrode plate is electrically connected to the positive electrode collector in a state of being splayed through the positive electrode splaying portion, and the negative electrode plate is electrically connected to the negative electrode collector in a state of being splayed through the negative electrode splaying portion.

(2) The invention of claim 2 is the secondary battery according to claim 1, in which the positive electrode splaying portion has a pair of folding positive electrode blades, the positive electrode plate is sandwiched and welded between the pair of positive electrode blades that have opened the positive electrode plate wide and the positive electrode collector, the negative electrode splaying portion has a pair of folding negative electrode blades, and the negative electrode plate is sandwiched and welded between the pair of negative electrode blades that have opened the negative electrode plate wide and the negative electrode collector.

(3) The invention of claim 3 is the secondary battery according to claim 2, in which the positive electrode collector has a pair of two-pronged collector connecting pieces, the positive electrode plate is sandwiched between the pair of positive electrode blades and the pair of collector connecting pieces, and the negative electrode collector has a pair of two-pronged collector connecting pieces, and the negative electrode plate is sandwiched and welded between the pair of negative electrode blades and the pair of collector connecting pieces.

(4) The invention of claim 4 is the secondary battery according to any one of claims 1 to 3, in which the insulation portion has a joint portion at both ends, the positive electrode shaft core portion and the negative electrode shaft core portion fold one piece of metal plate and sandwich the joint portion, and the positive electrode shaft core portion and the negative electrode shaft core portion are fixed using an insulating adhesive.

(5) The invention of claim 5 is the secondary battery according to any one of claims 1 to 4, in which the positive electrode plate includes metal foil consisting of aluminum or an aluminum alloy, the positive electrode shaft core portion is formed of a metal plate consisting of aluminum or an aluminum alloy, the negative electrode plate includes metal foil consisting of copper, a copper alloy, nickel, or a nickel alloy, and the negative electrode shaft core portion is formed of a metal plate consisting of copper, a copper alloy, nickel, or a nickel alloy.

(6) The invention of claim 6 is the secondary battery according to any one of claims 2 to 5, in which grooves for setting the folding locations of the pair of positive electrode blades and the pair of negative electrode blades are formed respectively at base ends of the pair of positive electrode blades and the pair of negative electrode blades.

(7) A method of preparing the secondary battery according to the invention of claim 7 includes a process in which a positive electrode plate and a negative electrode plate are wound through a separator on the circumferential surface of a shaft core so as to form a wound electrode group in a flat shape, a process in which a positive electrode shaft core portion provided with a pair of protruding positive electrode blades that press and splay the positive electrode plate on the end surface of the wound electrode group from inside to outside and a negative electrode shaft core portion provided with a pair of protruding negative electrode blades that press and splay a negative electrode plate on the end surface of the flat wound electrode group from inside to outside are integrated through an insulation portion so as to prepare the shaft core, a process in which the pair of positive electrode blades are splayed so as to press and splay the positive electrode plate on the end surface of the wound electrode group from inside to outside, and the pair of negative electrode blades are splayed so as to press and splay the negative electrode plate on the end surface of the wound electrode group from inside to outside, and a process in which the pressed-and-splayed positive electrode plate is connected to the positive electrode collector, and the pressed-and-splayed negative electrode plate is connected to the negative electrode collector.

(8) The invention of claim 8 is a method of preparing the secondary battery according to claim 7, in which a process in which the positive and negative electrode plates are connected to the positive and negative electrode collectors includes a process in which a laminate of positive electrode bodies is inserted between one of the pair of positive electrode blades and the positive electrode collector, a vibrator and an anvil are located respectively at the outside of the above positive electrode blade and the positive electrode collector so as to carry out first ultrasonic welding, a process in which a laminate of positive electrode bodies is inserted between the other one of the pair of positive electrode blades and the positive electrode collector, the vibrator and the anvil are located respectively at the outside of the above positive electrode blade and the positive electrode collector so as to carry out second ultrasonic welding, a process in which a laminate of negative electrode bodies is inserted between one of the pair of negative electrode blades and the negative electrode collector, the vibrator and the anvil are located respectively at the outside of the above negative electrode blade and the negative electrode collector so as to carry out third ultrasonic welding, and a process in which a laminate of negative electrode bodies is inserted between the other one of the pair of negative electrode blades and the negative electrode collector, the vibrator and the anvil are located respectively at the outside of the above negative electrode blade and the negative electrode collector so as to carry out fourth ultrasonic welding.

Advantageous Effects of Invention

According to the invention, there is no concern that the positive electrode body or the negative electrode body is damaged in a process in which the wound electrode group is connected to the collector, and the quality can be improved without increasing the preparation costs.

BRIEF DESCRIPTION OF DRAWINGS

FIG. 1 is a view showing the appearance of a first embodiment of the lithium ion secondary battery according to the invention.

FIG. 2 is an exploded perspective view of the lithium ion secondary battery.

FIG. 4 is a perspective view showing a flat wound electrode group of the lithium ion secondary battery.

FIG. 5 is a perspective view showing a shaft core of the lithium ion secondary battery.

FIG. 6 is an exploded perspective view of the shaft core.

FIG. 7 is a perspective view showing an insulation portion of the shaft core.

FIG. 8 is a plane view showing a material of a positive electrode shaft core portion of the shaft core.

FIG. 10 is a cross-sectional view showing the connection between the negative electrode shaft core portion and the insulation portion, and splaying grooves in the positive electrode splaying portion.

FIG. 11 is a perspective view showing the disposition of the shaft core in the flat wound electrode group.

FIG. 12 is a horizontal cross-sectional view of the wound electrode group showing the connection among the positive and negative electrode shaft core portions, the positive and negative electrode collecting portions, and the positive and negative electrode collectors.

FIG. 13 is a plane view of the wound electrode group showing the dimensions of the shaft core with respect to the flat wound electrode group.

FIG. 14 is a perspective view showing a winding process in which a winding apparatus is used.

FIG. 15 shows horizontal cross-sectional views of the wound electrode group which explain the connection between the negative electrode shaft core portion and the negative electrode collector in the negative electrode side end portion of the flat wound electrode group, in which (a) shows the appearance of the negative electrode blade before connection, and (b) shows the appearance of the wide-opened negative electrode blade.

FIG. 16 shows an appearance in which the blades of the flat wound electrode group are splayed so as to press and splay the positive electrode plate.

FIG. 17 is a plane view showing a material of a second embodiment of the shaft core.

FIG. 18 is a perspective view showing a state in which the material of the second embodiment is folded so as to form a shaft core, and the blades are splayed.

DESCRIPTION OF EMBODIMENTS

An example in which the invention is applied to a square lithium ion secondary battery will be described with reference to the accompanying drawings.

[First Embodiment]
[Configuration of the Square Battery]

Figure 1:
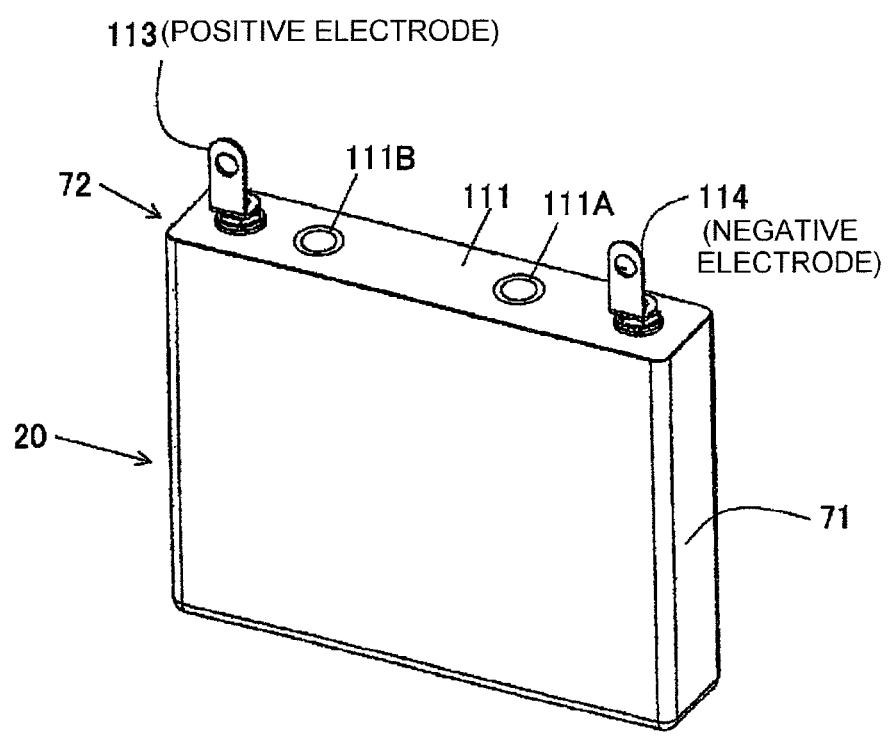
[FIG. 1]
Figure 2:
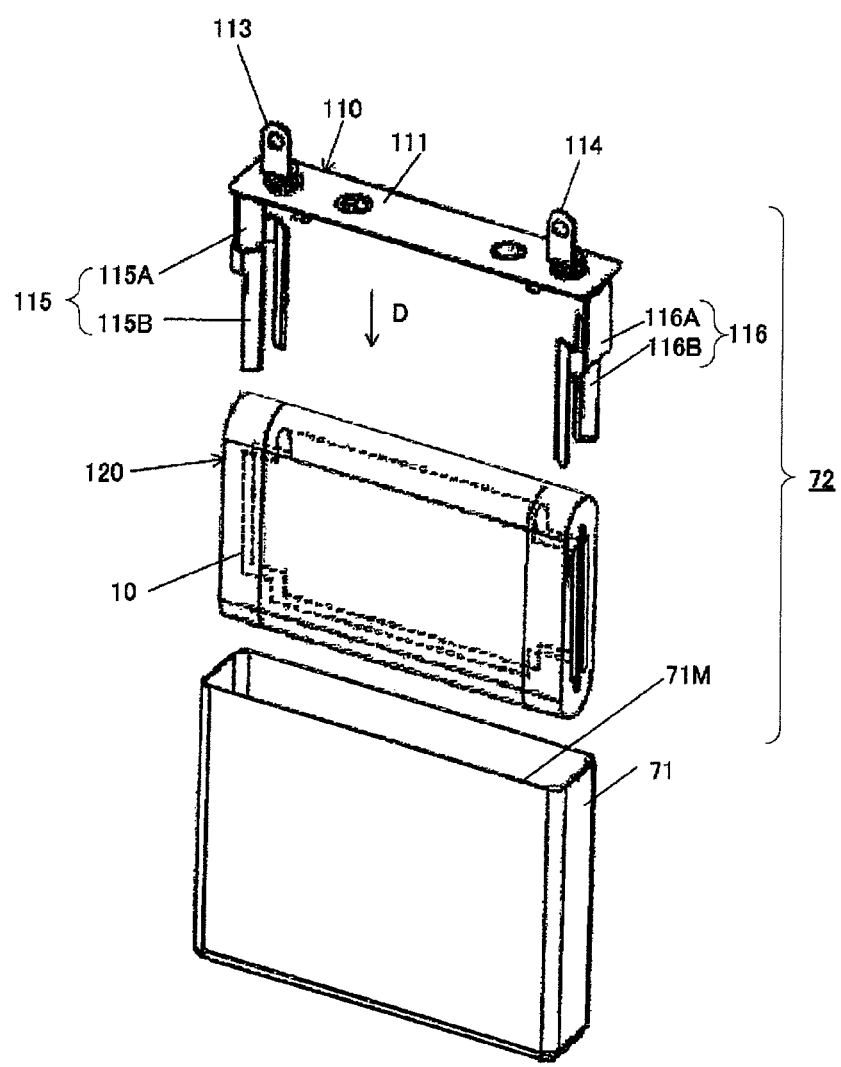
[FIG. 2]

As shown in FIG. 1, a lithium ion secondary battery 20 is configured to include a vessel 71 having an opening at one end portion and a power generation element assembly 72 accommodated in the vessel 71, which is shown in FIG. 2.

[Power Generation Element Assembly]

Figure 3:
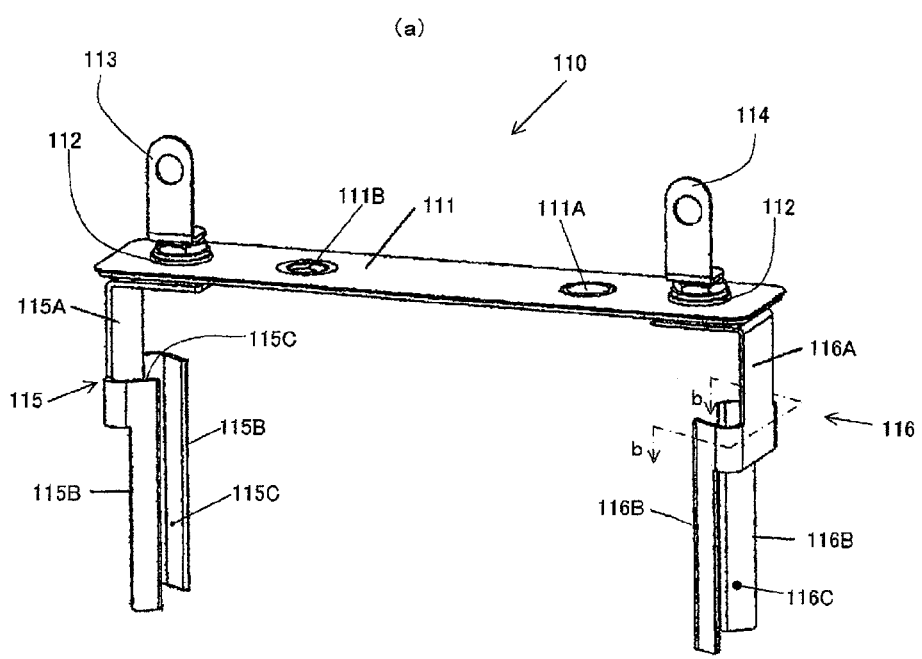
[FIG. 3] (a) is a perspective view showing a lid assembly of the lithium ion secondary battery, and (b) is a cross-sectional view of (a) along the line b-b.
Figure 3:
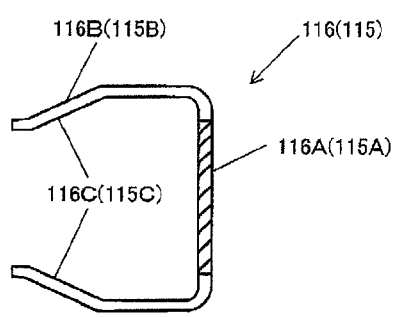
Figure 4:
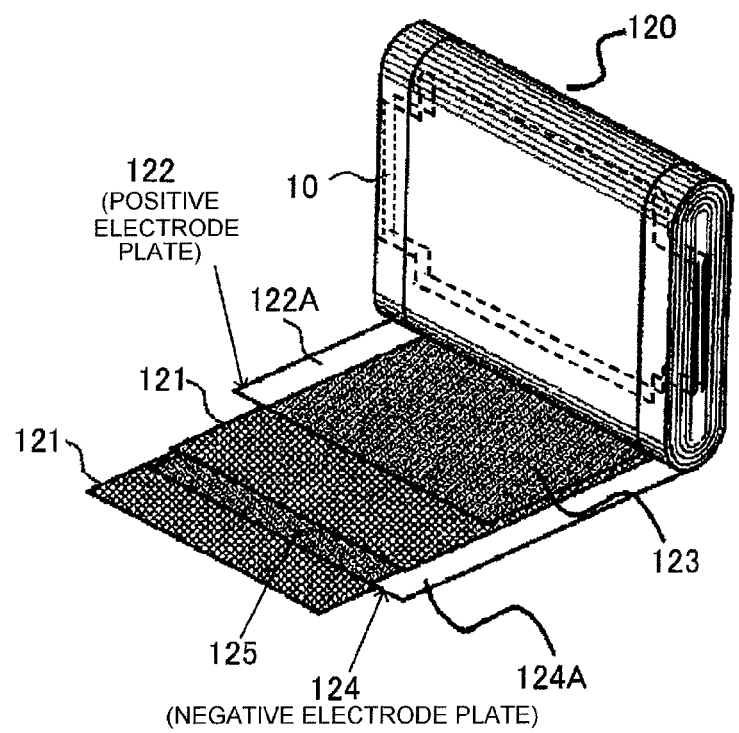
[FIG. 4]

As shown in FIG. 2, the power generation element assembly 72 has a lid assembly 110 shown in FIG. 3 and a flat wound electrode group 120 shown in FIG. 4.

[Lid Assembly]

As shown in FIG. 3, the lid assembly 110 has a lid 111 that blocks an opening 71M of the vessel 71, positive and negative electrode external terminals 113 and 114 which protrude from the lid 111 through insulating seal members 112, and positive and negative electrode collectors 115 and 116 connected respectively to the positive and negative electrode external terminals 113 and 114. The positive and negative electrode external terminals 113 and 114 and the positive and negative electrode collectors 115 and 116 are electrically insulated from the lid 111 through the insulating seal members 112.

The positive electrode collector 115 has a base portion 115A extending in a secondary battery bottom portion direction along the positive electrode side end surface of the flat wound electrode group 120 in the winding axis direction and a pair of positive electrode collector connection pieces 115B which are branched into two prongs from both bottom end side surfaces of the base portion 115A and extend in the vessel bottom portion direction. The pair of connection pieces 115B are inclined so that the interval between the connection pieces becomes narrower toward the front ends when seen from the above of the vessel 71 as shown in FIG. 3 (b). A pair of inner surfaces 115C in the pair of connection pieces 115B are joined to the external surface of a positive electrode uncoated portion (positive electrode collecting portion) 122A (refer to FIG. 4) of the flat wound electrode group 120 as described below.

Similarly, the negative electrode collector 116 has a base portion 116A extending in a secondary battery bottom portion direction along the negative electrode side end surface of the flat wound electrode group 120 in the winding axis direction and a pair of negative electrode collector connection pieces 116B which are branched into two prongs from both bottom end side surfaces of the base portion 116A and extend in the vessel bottom portion direction. Similarly to the connection pieces 115B, the pair of connection pieces 116B are inclined so that the interval between the connection pieces becomes narrower toward the front ends when seen from the above of the vessel 71. A pair of inner surfaces 116C in the pair of connection pieces 116B are joined to the external surface of a negative electrode uncoated portion (negative electrode collecting portion) 124A (refer to FIG. 4) of the flat wound electrode group 120 as described below.

As described below, the flat wound electrode group 120 is sandwiched so that the pair of positive electrode collector connection pieces 115B sandwich the positive electrode collecting portion 122A at one side end of the flat wound electrode group 120 and the pair of negative electrode collector connection pieces 116B sandwich the negative electrode collecting portion 124A at the other side end of the flat wound electrode group 120.

[Flat Wound Electrode Group]

As shown in FIG. 4, the flat wound electrode group 120 is configured by winding the separator 121 around a flat shaft core 10, and then sequentially winding the negative electrode plate (negative electrode sheet) 124, the separator 121, the positive electrode plate (positive electrode sheet) 122, and the separator 121 in a flat shape. The electrode plate on the outermost circumference of the flat wound electrode group 120 is the negative electrode plate 124, and, furthermore, the separator 121 is wound on the outside of the negative electrode plate.

The positive and negative electrode plates 122 and 124 have positive and negative electrode-joining agent layers 123 and 125 on which an active material-joining agent is coated at both surfaces of the positive and negative electrode foils, and are provided with positive and negative electrode collecting portions (positive and negative electrode uncoated portions) 122A and 124A on which an active material-joining agent is not coated at one end portion of the respective electrode foils in the width direction (a direction orthogonal to the winding direction) respectively. The positive and negative electrode collecting portions 122A and 124A are areas through which the metal surfaces of the respective electrode foils are exposed. Meanwhile, the positive and negative electrode collecting portions 122A and 124A are formed respectively at the opposite location in the width direction when being wound.

The negative electrode-joining agent layer 125 is larger than the positive electrode-joining agent layer 123 in the width direction, whereby the positive electrode-joining agent layer 123 is configured to be necessarily sandwiched by the negative electrode-joining agent layer 125.

Meanwhile, the separator 121 is wider than the negative electrode-joining agent layer 125 in the width direction, and both ends of the separator are wound on the inside of the width direction ends of the positive electrode collecting portion 122A and the negative electrode collecting portion 124A through which the metal foil surfaces are exposed so that no hindrance is caused to a process in which the positive electrode collecting portion 122A and the negative electrode collecting portion 124A are bundled and welded.

In the negative electrode plate 124, 10 parts by mass of polyvinylidene fluoride (hereinafter referred to as PVDF) was added as a binder with respect to 100 parts by mass of amorphous carbon powder which served as a negative electrode active material, N-methylpyrrolidone (hereinafter referred to as NMP) was added as a dispersion solvent thereto and kneaded, thereby preparing a negative electrode-joining agent. The negative electrode-joining agent was coated on both surfaces of a 10 μm-thick copper foil except the blank negative electrode collecting portion 124A. After that, drying, pressing, and cutting were carried out so as to obtain the negative electrode plate 124 having a thickness of the negative electrode active material-coated portion not including the copper foil of 70 μm.

In the positive electrode plate 122, 10 parts by mass of scale-like graphite as a conducting material and 10 parts by mass of PVDF as a binder were added with respect to 100 parts by mass of lithium manganese oxide (chemical formula $LiMn_2O_4$) which served as a positive electrode active material, NMP was added as a dispersion solvent to the above solution and stirred, thereby preparing a positive electrode-joining agent. The positive electrode-joining agent was coated on both surfaces of a 20 μm-thick aluminum foil except the blank positive electrode collecting portion 122A. After that, drying, pressing, and cutting were carried out so as to obtain the positive electrode plate 122 having a thickness of the positive electrode active material-coated portion not including the aluminum foil of 90 μm.

[Shaft Core]

A shaft core 10 will be described with reference to FIGS. 5 to 11.

Figure 5:
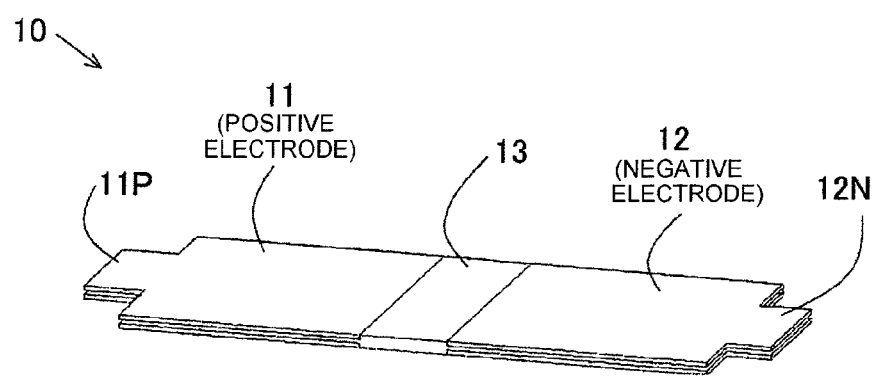
[FIG. 5]
Figure 6:
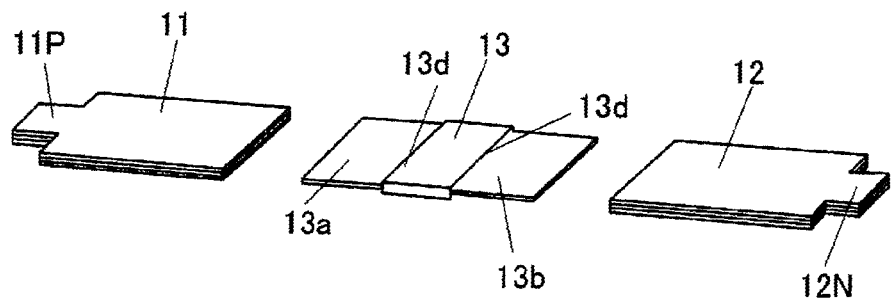
[FIG. 6]

As shown in FIGS. 5 and 6, the flat shaft core 10 has an insulation portion 13 at the center in the longitudinal direction, a positive electrode shaft core portion 11 and a negative electrode shaft core portion 12 respectively mounted on positive and negative electrode joint portions 13a and 13b at both end portions of the insulation portion 13 in the longitudinal direction, and is formed into a substantially rectangular thin plate shape as a whole. A positive electrode splaying portion 11P and a negative electrode splaying portion 12N are provided at the outside end portions of the positive electrode shaft core portion 11 and the negative electrode shaft core portion 12 respectively.

Figure 7:
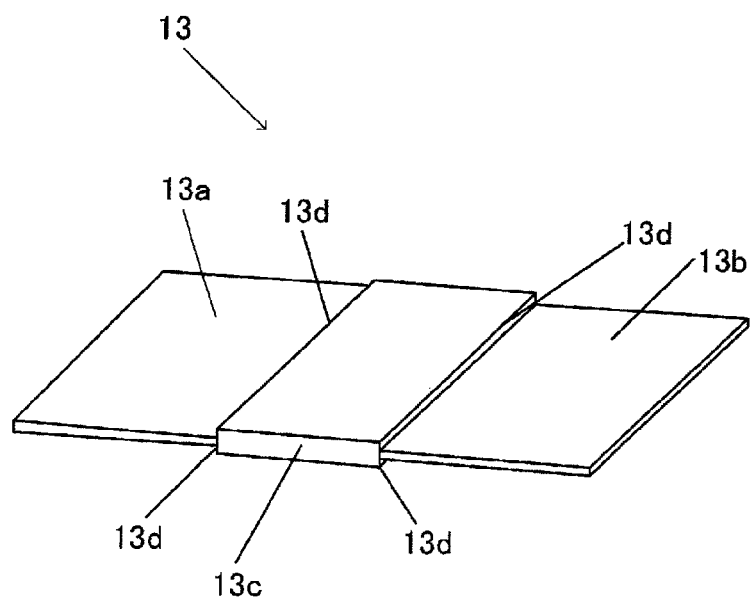
[FIG. 7]

FIG. 7 is a perspective view of the insulation portion 13. The insulation portion 13 is prepared using, for example, a highly heat-resistant PPS resin. The insulation portion 13 is constituted by a thick plate main body 13c at the central portion, the thin plate joint portions 13a and 13b protruding from both ends of the main body 13c. Level differences 13d are formed at the connecting portions between the thick plate main body 13c and the thin plate joint portions 13a and 13b.

Figure 8:
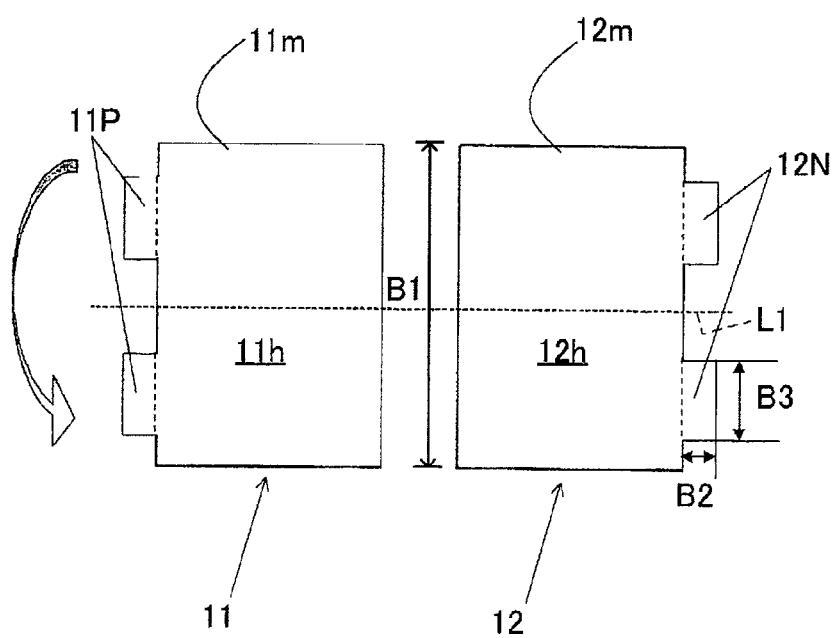
[FIG. 8]

FIG. 8 is a view showing a material of the positive electrode shaft core portion 11 and the negative electrode shaft core portion 12. The positive electrode shaft core portion 11 is prepared by folding a thin plate-like positive electrode metal material 11m consisting of the same aluminum or aluminum alloy as for the positive electrode plate 122. The positive electrode metal material 11m has a positive electrode rectangular metal main body 11h and a pair of protrusions (blades) 11P protruding from one end of the main body in an axially symmetric manner with respect to the center line L1. The positive electrode shaft core portion 11 is folded into a U shape by folding the metal plate 11m which is the material back as shown by the blanked arrow at the center folding line L1, and the positive electrode joint portion 13a is inserted. In addition, the positive electrode shaft core portion 11 and the insulation portion 13 are joined using an adhesive. At this time, the pair of protrusions 11P are disposed mutually opposite.

The negative electrode shaft core portion 12 is prepared by folding a thin plate-like negative electrode metal material 12m consisting of the same copper or copper alloy as for the negative electrode plate 124. The negative electrode metal material 12m has a negative electrode rectangular metal main body 12h and a pair of protrusions (blades) 12N protruding from one end of the main body in an axially symmetric manner with respect to the center line L1. The negative electrode shaft core portion 12 is folded into a U shape by folding the negative electrode metal material 12m which is the material back as shown by the blanked arrow at the center folding line L1, and the negative electrode joint portion 13b is inserted. In addition, the negative electrode shaft core portion 12 and the insulation portion 13 are joined using an adhesive. At this time, the pair of protrusions 12N are disposed mutually opposite.

As described above, the positive electrode shaft core portion 11 and the negative electrode shaft core portion 12 are adhered and fixed to the joint portions 13a and 13b using an adhesive. Examples of the adhesive being used include acryl resins. Therefore, the positive electrode shaft core portion 11 and the negative electrode shaft core portion 12 are insulated through the insulation portion 13, and are mutually coupled.

Figure 9:
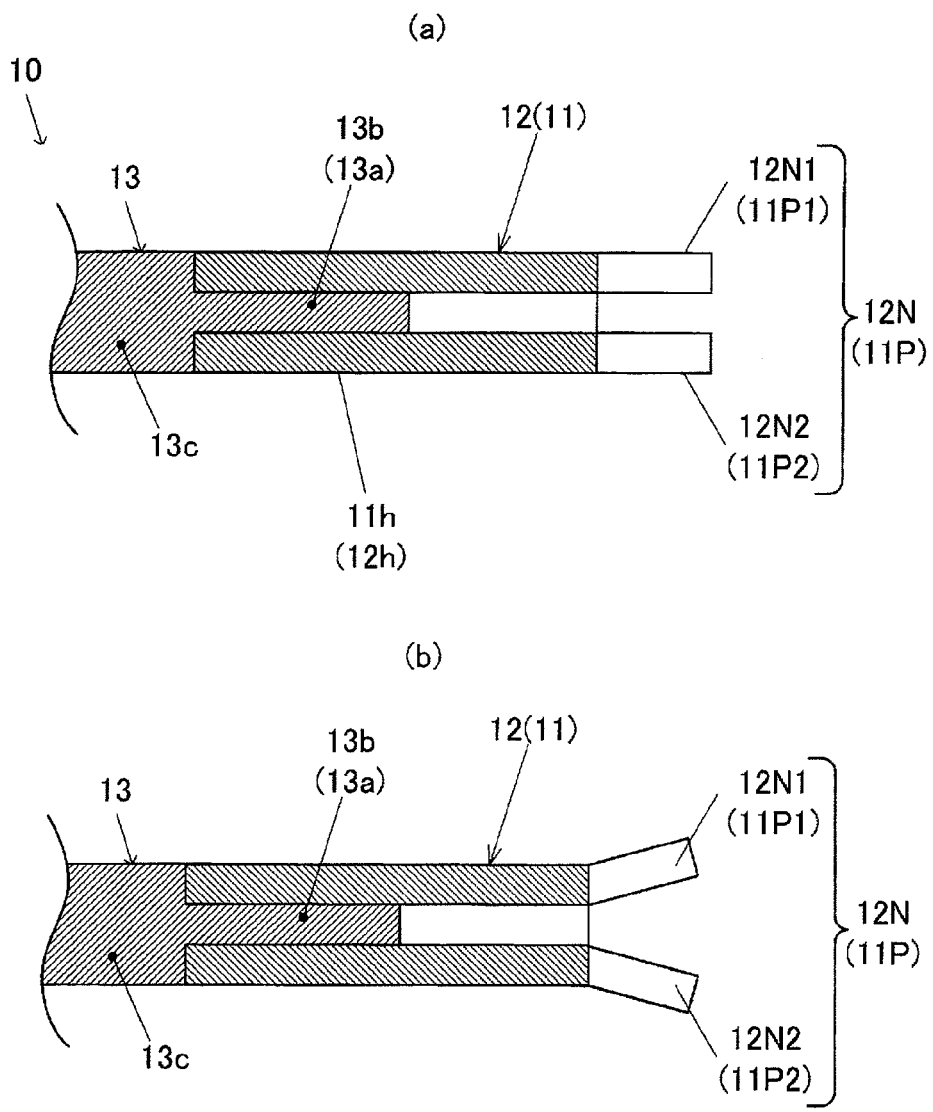
[FIG. 9] (a) is a cross-sectional view showing the connection between a negative electrode shaft core portion and the insulation portion, and (b) is a cross-sectional view showing a splayed splaying portion of the negative electrode shaft core portion.

FIG. 9 shows the laminate structure of the shaft core 10. As shown in FIG. 9(a), the positive and negative electrode shaft core portions 11 and 12 are folded as described above and joined to the positive and negative electrode joint portions 13a and 13b provided in a protruding manner from the main body 13c of the insulation portion 13, and the positive electrode splaying portion 11P and the negative electrode splaying portion 12N are provided in a protruding manner from the respective end portions of the shaft core portions 11 and 12. The positive electrode splaying portion 11P has a pair of facing blades 11P1 and 11P2, and the negative electrode splaying portion 12N has a pair of facing blades 12N1 and 12N2.

As shown in FIG. 9(b), it is possible to press and open the metal foil laminate at the end surface of the wound electrode group, that is, plane areas 120P of the compressed positive and negative electrode collecting portions 122A and 124A from the central portion into a V shape by opening the pairs of blades 11P1 and 11P2 and 12N1 and 12N2.

Figure 10:
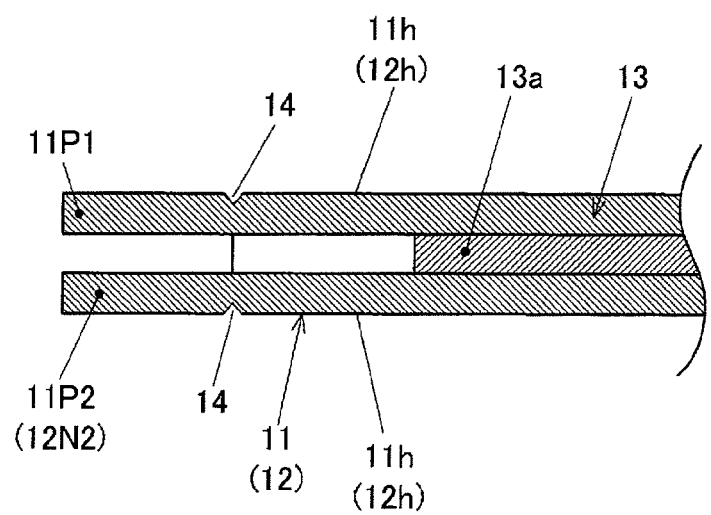
[FIG. 10]

As shown in FIG. 10, V grooves 14 are formed respectively at a portion at which the positive electrode protrusion 11P and the rectangular positive electrode metal main body 11h are coupled and a portion at which the negative electrode protrusion 12N and the rectangular negative electrode metal main body 12h are coupled respectively. The pair of protrusions 11P and the pair of protrusions 12N can be easily splayed at precise locations using the V grooves 14.

Figure 11:
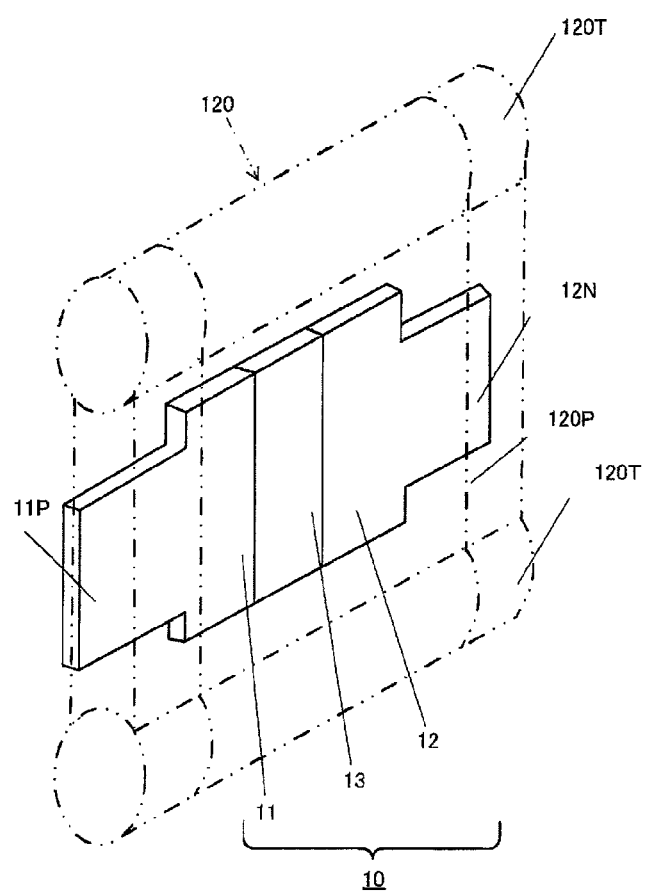
[FIG. 11]

FIG. 11 shows appearance view in which the positive and negative electrode plates 122 and 124 are wound on the flat shaft core 10, and then some areas 120P of the positive and negative electrode collecting portions 122A and 124A are compressed. In the plane areas 120P, the positive and negative electrode collectors 115 and 116 are connected to the positive and negative electrode collecting portions 122A and 124A respectively.

Meanwhile, folding end portions 120T of the positive and negative electrode plates 122 and 124 form a curved shape.

Figure 12:
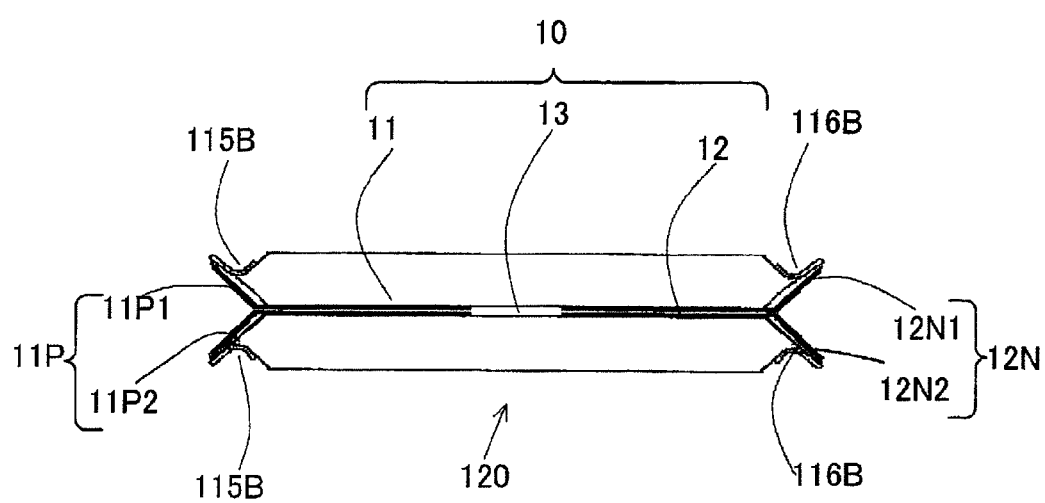
[FIG. 12]

FIG. 12 will be referenced for description. In the plane area 120P in which the positive electrode collecting portion 122A is compressed, the pair of blades 11P1 and 11P2 of the positive electrode splaying portion 11P provided in the inside of the plane area are splayed in a V shape, the positive electrode collecting portion 122A is interposed between the pair of blades 11P1 and 11P2 and the pair of positive electrode collector connection pieces 115B, and is ultrasonically welded. Meanwhile, in the plane area 120P in which the negative electrode collecting portion 124A is compressed, the pair of blades 12N1 and 12N2 of the negative electrode splaying portion 12N provided in the inside of the plane area are splayed in a V shape, the negative electrode collecting portion 124A is interposed between the pair of blades 12N1 and 12N2 and the pair of negative electrode collector connection pieces 116B, and is ultrasonically welded.

Thereby, the positive electrode collecting portion 122A and the negative electrode collecting portion 124A of the flat wound electrode group 120 are electrically connected to the external positive electrode terminal 113 and the external negative electrode terminal 114 respectively through the positive electrode collector 115 and the negative electrode collector 116.

The dimensions of the respective portions of the flat wound electrode group 120 will be described with reference to FIG. 13.

As described above, an operation that presses and splays the positive and negative electrode collecting portions 122A and 124A at the positive and negative electrode splaying portions 11P and 12N from inside is necessary. Therefore, the positive and negative electrode splaying portions 11P and 12N are provided in a protruding manner as much as necessary for the operation from both end surfaces of the positive and negative electrode collecting portions 122A and 124A. In addition, it is necessary to electrically connect the positive and negative electrode collecting portions 122A and 124A and the positive and negative electrode shaft core portions 11 and 12. Therefore, a protruding length B2 of the pair of protrusions 11P and 12N of the positive and negative electrode splaying portions 11P and 12N is set to be larger than a width C2 of the positive and negative electrode collecting portions 122A and 124A.

Figure 13:
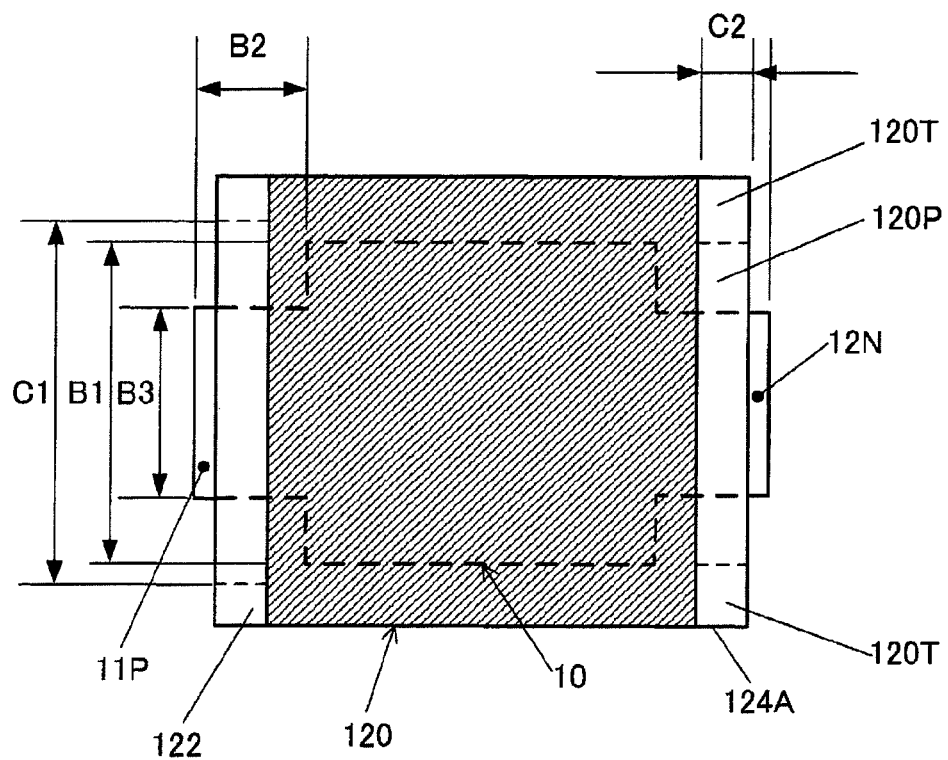
[FIG. 13]

In FIG. 13, C1 represents a length of the plane area 120P in the winding direction, B1 represents a length of the flat shaft core 10 in the winding direction, and B3 is a length of the protrusions 11P and 12N of the flat shaft core 10 in the winding direction.

[Assembling of Power Generation Element Assembly]

The assembling sequence of the power generation element assembly 72 will be described.

Firstly, the flat wound electrode group 120 shown in FIG. 4 is prepared. That is, the separator 121 is wounded around the shaft core 10 shown in FIG. 5 one or more circuits, the positive electrode foil 122 and the negative electrode foil 124 are insulated through the separator 121, laminated, and wound. The separator 121 on the outermost surface of the flat wound electrode group 120 is locked using a tape which is not shown.

Figure 14:
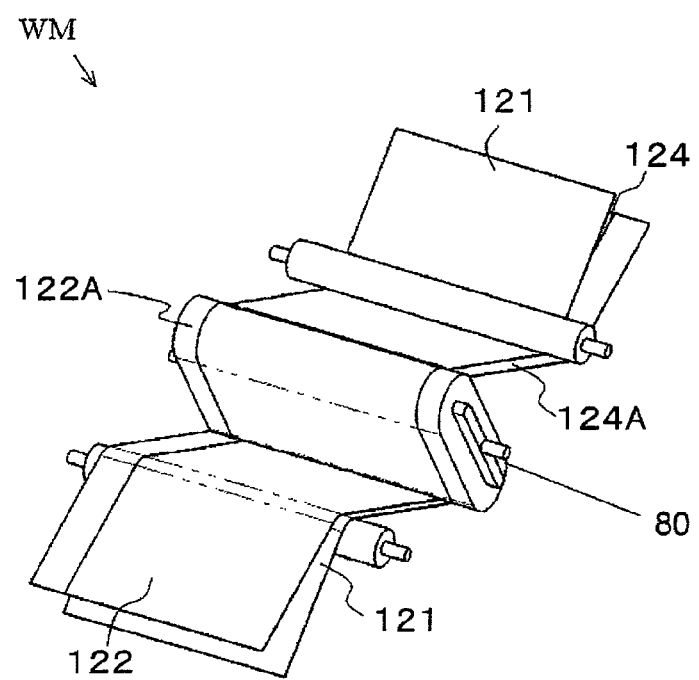
[FIG. 14]

When the flat wound electrode group 120 is prepared, as shown in FIG. 14, a rotation shaft 80 of a winding machine WM is inserted between two positive and negative electrode shaft core portions 11 and 12 of the shaft core 10, and the positive electrode plate 122 and the negative electrode plate 124 are wound through the separator 121. Thereby, the shaft core 10 can be easily disposed in the inside of the flat wound electrode group 120, and the process can be simplified.

Prior to integration of the flat wound electrode group 120 and the positive and negative electrode collectors 115 and 116, the uncoated portions 122A and 124A of the flat wound electrode group 120 are pressed and deformed in the thickness direction. The deformed plane area 120P is shown in FIG. 11.

The lid assembly 110 is moved in an arrow D direction in FIG. 2 so that the inner surfaces 115C of the pair of two-pronged connection pieces 115B of the positive electrode collector 115 are made to come into contact with the plane area 120P of the positive electrode collecting portion 122A of the flat wound electrode group 120, and the inner surfaces 116O of the pair of two-pronged negative electrode collector connection pieces 116B of the negative electrode collector 116 come into contact with the plane area 120P of the negative electrode collecting portion 124A, and the flat wound electrode group 120 is inserted between the pair of connection pieces 115B of the positive electrode collector 115 and between the pair of connection pieces 116B of the negative electrode collector 116.

Figure 15:
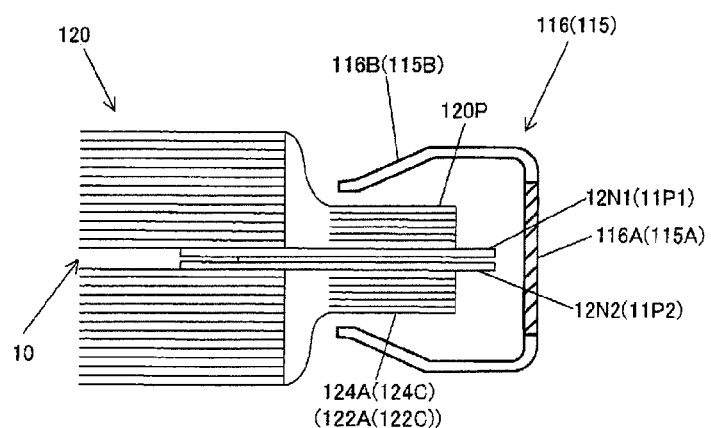
[FIG. 15]
Figure 15:
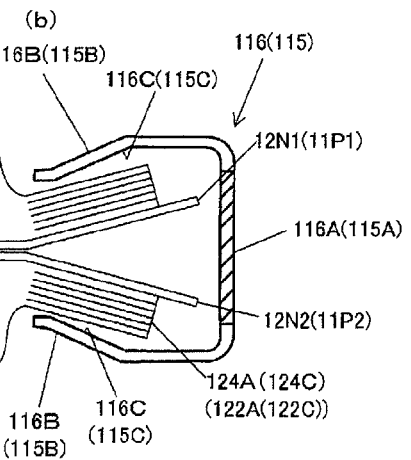

FIG. 15 (a) is a horizontal cross-sectional view of the, negative electrode end portion side when the lid assembly 110 and the wound electrode group 120 are integrated in the above manner. After the flat wound electrode group 120 is inserted between the positive and negative electrode collectors 115 and 116, laminate 124C of the negative electrode collecting portion 124A is pressed and opened outward from the inner circumferential side at the end surface of the flat wound electrode group 120 by gripping the front ends of the pair of blades 12N1 and 12N2 of the negative electrode splaying portion 12N with fingers and opening the front ends as shown in FIG. 15(b), and the laminate 124C at the end surface of the flat wound electrode group 120 is splayed in a V shape as shown in FIG. 15 (b) Laminate 122C at the end surface of the positive electrode collecting portion 122A is also pressed, opened, and splayed in the same manner.

Figure 16:
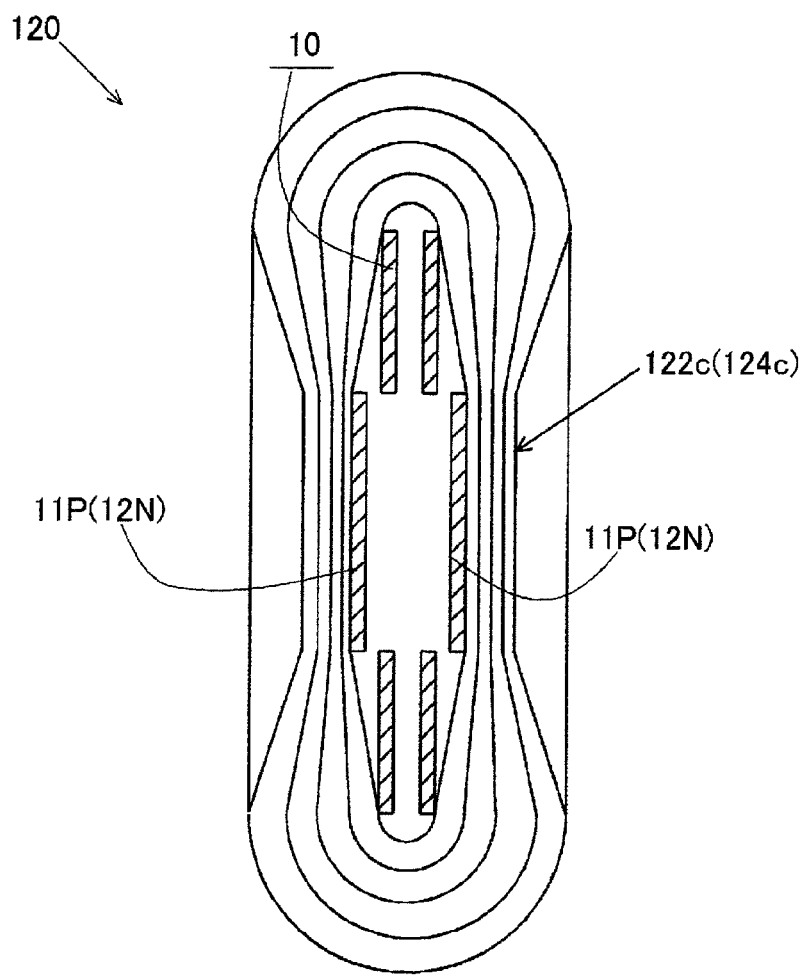
[FIG. 16]

FIG. 16 is a view of the flat wound electrode group 120 seen from the end surface thereof, and shows a view in which the laminates 122C and 124C of the positive and negative electrode collecting portions 122A and 124A are pressed and opened rightward and leftward through the splaying portions 11P and 12N.

After the uncoated portion laminates 122C and 124C at both end surfaces of the flat wound electrode group 120 are pressed and opened outward through the positive and negative electrode splaying portions 11P and 12N as shown in FIGS. 15 (b) and 16, the vibrator and the anvil of an ultrasonic welding apparatus are located at the outside of the two-pronged negative electrode connection plate 116B and the protrusion 12N1, the uncoated portion laminate 124C is sandwiched between the joining surface 116C of the negative electrode collector connection piece 116B and the negative electrode protrusion 12N1, and is ultrasonically welded. Next, the vibrator and the anvil of the ultrasonic welding apparatus are located at the outside of the joining surface 116C of the negative electrode collector connection piece 116B and the other negative electrode protrusion 12N2, the uncoated portion laminate 124C is sandwiched between the joining surface 116C of the negative electrode collector connection piece 116B and the negative electrode protrusion 12N1, and is ultrasonically welded. The positive electrode side is also joined in the same manner. Thereby, the flat wound electrode group 120 is electrically connected to the positive and negative electrode collectors 115 and 116.

The uncoated portion laminates 122C and 124C are welded to the connection pieces 115B and 116B at, for example, two places in the circumferential direction so that the conducting paths from the positive electrode foil 122 and the negative electrode foil 124 to the collectors 115 and 116 can be shortened, the connection resistance can be decreased, and the output of the battery can be increased.

According to the above assembling sequence, the negative electrode collecting portion 124A exposed on the front and rear surfaces of the flat wound electrode group 120 are integrated and thus connected with the protrusions 12N1 and 12N2, and the connection piece 116B of the negative electrode collector 116. In addition, while not shown in the drawing, the positive electrode collecting portion 122A exposed at the front and rear surfaces of the flat wound electrode group 120 are integrated and thus connected with the protrusions 11P1 and 11P2, and the connection piece 115B of the positive electrode collector 115.

Meanwhile, since the positive electrode shaft core portion 11 and the negative electrode shaft core portion 12 are insulated through the insulation portion 13, the external positive electrode terminal 113 and the external negative electrode terminal 114 are mutually insulated through the insulation portion 13 of the shaft core 10.

A method of preparing the secondary battery of the first embodiment described above has the following first to fourth processes.

First process: a process in which the positive electrode plate 122 and the negative electrode plate 124 are wound on the circumferential surface of the shaft core 10 through the separator 121 so as to form the wound electrode group 120 in a flat shape Second process: a process in which the positive electrode shaft core portion 11 provided with the pair of protruding positive electrode blades 11P that press and splay the positive electrode plate 122 on the end surface of the wound electrode group 120 from inside to outside and the negative electrode shaft core portion 12 provided with the pair of protruding negative electrode blades 12N that press and splay the negative electrode plate 124 on the end surface of the wound electrode group 120 from inside to outside are integrated through the insulation portion 13 so as to prepare the shaft core 10

Third process: a process in which the pair of positive electrode blades 11P are splayed so as to press and splay the positive electrode plate 122 on the end surface of the wound electrode group 120 from inside to outside, and the pair of negative electrode blades 12N are splayed so as to press and splay the negative electrode plate 124 on the end surface of the wound electrode group 120 from inside to outside Fourth process: a process in which the pressed-and-splayed positive electrode plate 122 is connected to the positive electrode collector 115, and the pressed-and-splayed negative electrode plate 124 is connected to the negative electrode collector 116.

In addition, the fourth process has the following first to fourth ultrasonic welding processes.

First ultrasonic welding process: a process in which the laminate 122C of the positive electrode bodies 122 is inserted between one of the pair of positive electrode blades 11P and the positive electrode collector 115, and the vibrator and the anvil are located at the outside of the above positive electrode blade 11P and the positive electrode collector 115 so as to carry out the first ultrasonic welding Second ultrasonic welding process: a process in which the laminate 122C of the positive electrode bodies 122 is inserted between the other one of the pair of positive electrode blades 11P and the positive electrode collector 115, and the vibrator and the anvil are located at the outside of the above positive electrode blade 11P and the positive electrode collector 115 so as to carry out the second ultrasonic welding Third ultrasonic welding process: a process in which the laminate 124C of the negative electrode bodies 124 is inserted between one of the pair of negative electrode blades 12N and the negative electrode collector 116, and the vibrator and the anvil are located at the outside of the above negative electrode blade 12N and the negative electrode collector 116 so as to carry out the third ultrasonic welding Fourth ultrasonic welding process: a process in which the laminate 124C of the negative electrode bodies 124 is inserted between the other one of the pair of negative electrode blades 12N and the negative electrode collector 116, and the vibrator and the anvil are located at the outside of the above negative electrode blade 12N and the negative electrode collector 116 so as to carry out the fourth ultrasonic welding The square lithium ion secondary battery according to the first embodiment described above can exhibit the following actions and effects.

(1) The positive and negative electrode shaft core portions 11 and 12 were provided at both end portions of the shaft core 10 of the wound electrode group 120, and the splaying portions 11P and 12N consisting of the pair of protrusions 11P and 12N were provided at the end portions. When the positive and negative electrode plates 122 and 124 were welded to the positive and negative electrode collectors 115 and 116, the positive and negative electrode splaying protrusions 11P and 12N were splayed so as to press and open the laminates 122C and 124C on the end surfaces of the positive and negative electrode plates 122 and 124. In addition, the positive electrode laminate 122C is sandwiched and welded between the positive electrode splaying protrusion 11P and the connection piece 115B of the collector 115, and the negative electrode laminate 124C is sandwiched and welded between the negative electrode splaying protrusion 12N and the connection piece 116B of the collector 116. Therefore, the foil laminates 122C and 124C which are easily deformed or damaged can be easily splayed, and the positive and negative electrode collecting portions 122A and 124A can be connected to the positive and negative electrode collectors 115 and 116 without causing damage to the positive and negative electrode foils 122 and 124.

(2) The splaying protrusions 11P and 12N that press and open the uncoated portion laminates 122C and 124C which are wound in a multiple oval shape outward are provided at both end portions of the shaft core 10 of the wound electrode group 120. Therefore, the electrode foils of the uncoated portions 122A and 124A that are easily folded or deformed can be easily and reliably bundled and welded between the joining surfaces 115C and 116C of the collectors 115 and 116. Thereby, it is possible to join the electrode foils at a high operation efficiency, enhance the productivity, and decrease the costs.

(3) Since the laminates 122C and 124C are pressed and opened through the splaying protrusions 11P and 12N provided inside the innermost circumferential foils of the uncoated portions 122A and 124A, there is no case in which the layers of the splaying electrode foils are deviated or bitten into. Thereby, a high operation efficiency and a high productivity can be achieved, and the production costs can be reduced.

(4) The splaying protrusions 11P and 12N which are operated using fingers or robot hands were provided at the splaying portions 11P and 12N, and the splaying protrusions 11P and 12N were made to protrude from both end surfaces of the wound electrode group 120. Therefore, the splaying protrusions 11P and 12N can be simply operated.

(5) The shaft core 10 was configured to include the positive electrode shaft core portion 11 having the positive electrode splaying portion 11P provided at one end, the negative electrode shaft core portion 12 having the negative electrode splaying portion 12N provided at the other end, and the insulation portion 13 that mutually insulates and thus integrates the positive electrode shaft core portion 11 and the negative electrode shaft core portion 12. Therefore, it is not necessary to separately provide operation members that open the laminates 122C and 124C on the end surfaces of the wound electrode group 120 wide, and the number of components can be reduced.

(6) Both ends of the shaft core 10 were made to be the conductive positive and negative electrode shaft core portions 11 and 12 as described above, and the splaying portions 11P and 12N having the splaying protrusions 11P and 12N at the end portions were provided. When the positive electrode collecting portion 122A and the positive and negative electrode connection pieces 115B are ultrasonically welded, and the negative electrode collecting portion 124A and the negative electrode collector connection piece 116B are ultrasonically welded, both the connection pieces 115B and 116B need a doubling plate; however, in the embodiment, the positive and negative electrode splaying protrusions 11P and 12N can be used as the doubling plate, and therefore the man-hour and the number of components during the ultrasonic welding can be reduced.

(7) The V grooves 14 were provided at the base ends of the protrusions 11P and 12N of the positive and negative electrode shaft core portions 11 and 12. Therefore, the accuracy of the folding of the positive electrode splaying portion 11P and the negative electrode splaying portion 12N improves, and therefore the costs for the process of bundling, compressing, and sandwiching the positive electrode collecting portions 122A and 124A can be reduced.

[Second Embodiment]

A second embodiment in which the lithium ion secondary battery according to the invention is applied to a square battery will be described with reference to FIGS. 17 and 18. Meanwhile, in the drawings, identical or similar portions to those in the first embodiment will be given the same reference number, and will not be described.

In the second embodiment, the protrusions 11P and 12N are not used as the material that forms the positive and negative electrode splaying portions 11P and 12N, and a material that forms cut portions 12c and 11c formed at the outside end portions of the positive and negative electrode shaft core portions 11 and 12 is used as the material.

Figure 17:
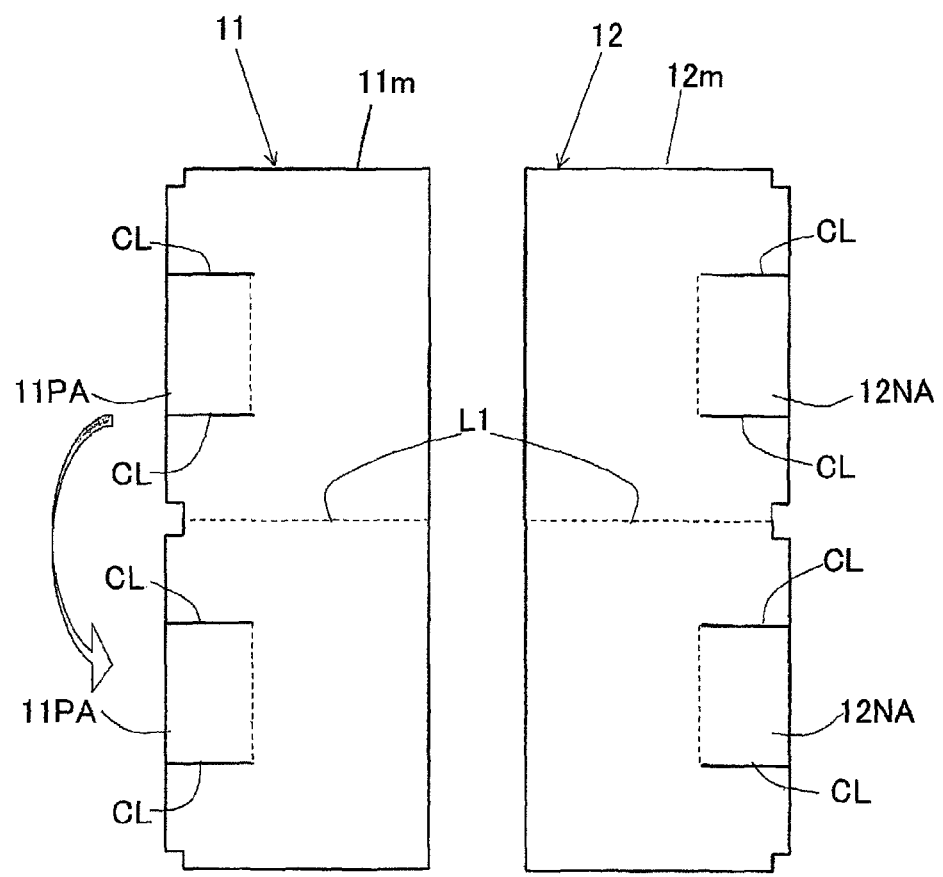
[FIG. 17]
Figure 18:
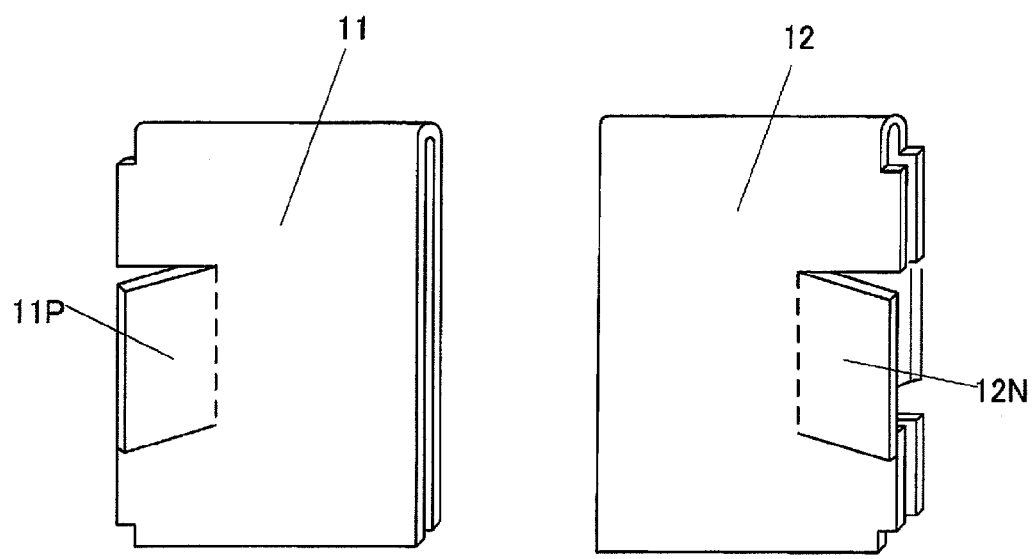
[FIG. 18]

FIG. 17 is a view showing the material of the positive electrode shaft core portion 11 and the negative electrode shaft core portion 12. The positive electrode shaft core portion 11 is prepared by folding the thin plate-like positive electrode metal material 11m consisting of the same aluminum or aluminum alloy as for the positive electrode plate 122. The positive electrode metal material 11m includes a positive electrode rectangular metal main body 11h and a pair of cutting pieces (blades) 11PA provided in an axially symmetric manner with respect to the center line L1 from one end of the main body. The pair of cutting pieces (blades) 11PA configure the positive electrode splaying portion 11P. The pair of cutting pieces 11PA are configured by forming a pair of cuts CL at both sides.

The positive electrode shaft core portion 11 is folded into a U shape by folding the metal plate 11m which is the material back as shown by a blanked arrow at the center folding line L1, and is joined to the insulation portion 13 by facing the pair of cutting pieces 11PA so that the positive electrode joint portion 13a is inserted. The pair of cutting pieces 11PA are the blades 11P1 and 11P2 of the positive electrode splaying portion 11P described above.

The negative electrode shaft core portion 12 is prepared by folding the thin plate-like negative electrode metal material 12m consisting of the same aluminum or aluminum alloy as for the negative electrode plate 122. The negative electrode metal material 12m has a negative electrode rectangular metal main body 12h and a pair of cutting pieces (blades) 12PA provided in an axial symmetric manner with respect to the center line L1 from one end of the main body. The pair of cutting pieces (blades) 12NA configure the negative electrode splaying portion 12N. The pair of cutting pieces 12NA are configured by forming a pair of cuts CL at both sides.

The negative electrode shaft core portion 12 is folded into a U shape by folding the metal material 12m which is the material back as shown by the blanked arrow at the center folding line L1, and is joined to the insulation portion 13 by facing the pair of cutting pieces 12NA so that the negative electrode joint portion 13a is inserted. The pair of cutting pieces 12NA are the blades 12N1 and 12N2 of the negative electrode splaying portion 12N described above.

Meanwhile, similarly to the first embodiment, the pair of cutting pieces 11PA and the pair of cutting pieces 12NA are easily folded and have a high folding location precision due to the V grooves formed on the surface of the material.

The positive electrode shaft core portion 11 and the negative electrode shaft core portion 12 are adhered and fixed to the joint portions 13a and 13b using an adhesive. Examples of the adhesive being used include acryl resins. Therefore, the positive electrode shaft core portion 11 and the negative electrode shaft core portion 12 are insulated through the insulation portion 13, and are mutually coupled.

Similarly to the first embodiment, in a state in which the flat wound electrode group 120 is wound and configured, the positive electrode splaying portions 11P1 and 11P2, and the negative electrode splaying portions 12N1 and 12N2 are closely attached to each other so as to be closed; however, after that, the positive electrode splaying portions 11P1 and 11P2, and the negative electrode splaying portions 12N1 and 12N2 are splayed respectively, and are faired into a V shape along the positive electrode collector connection piece 115B and the negative electrode collector connection piece 116B respectively. Thereby, it becomes possible to ultrasonically weld the positive electrode collecting portions 122A and 124A while the positive electrode collecting portions 122A and 124A are sandwiched between the positive and negative electrode splaying portions 11P and 12N, and the positive and negative electrode connection pieces 115B and 116B respectively.

Thereby, the positive electrode collecting portion 122A and the negative electrode collecting portion 124A of the flat wound electrode group 120 are electrically connected to the external positive electrode terminal 113 and the external negative electrode terminal 114 respectively through the positive electrode collector connection piece 115B and the negative electrode collector connection piece 116B.

The positive electrode splaying portion 11P and the negative electrode splaying portion 12N which are the protruding portions of the shaft core 10 are set to be longer than the width of the flat wound electrode group 120 so that the positive electrode splaying portion and the negative electrode splaying portion protrude in the winding axis direction from the flat wound electrode group 120 in a state of yet to be splayed, and the positive electrode splaying portion 11P and the negative electrode splaying portion 12N can be gripped with fingers when being splayed.

In addition to the effects of the first embodiment, the second embodiment exhibits an effect that the positive electrode splaying portion 11P and the negative electrode splaying portion 12N can be formed through formation of the cuts CL only so that the manufacturing costs of the metal plates 11m and 12m can be further reduced.

[Modified Example]

The embodiments described above can be modified in the following manner.

(1) In the above embodiments, for example, a highly heat-resistant PPS resin is used for the insulation portion 13 of the shaft core 10, and an acryl resin is used for the adhering material, but the materials are not limited thereto as long as the materials have insulating properties and a high adhering intensity.

(2) In the above embodiments, the level differences 13d are formed at the insulation portion 13 of the shaft core 10, but the negative electrode side joint portion 13a, the positive electrode side joint portion 13b, and the main body 13c are made to have the constant thickness so as to remove the level differences 13d.

(3) In the above embodiment, examples in which aluminum, an aluminum alloy, copper, and a copper alloy are used for the positive and negative electrode shaft core portions 11 and 12 are shown, but the materials are not limited thereto, and the material is not particularly limited as long as the material is not corroded due to the battery potential of the respective electrodes and has conductivity, for example, nickel and the like.

(4) In the above embodiment, an example in which amorphous carbon is used as the negative electrode active material is shown, but the material is not limited thereto, the material may be natural graphite which lithium ions can be removed from and inserted into, a variety of artificial graphite materials, carbon materials such as cokes, or the like, and the particle shape may be scale-like, spherical, fibrous, lump-like, or the like, and is also not particularly limited.

(5) In the above embodiment, an example in which lithium manganese oxide having a stoichiometric composition (LiMn$_2$O$_4$) is used as the positive electrode active material is shown, but other lithium manganite having a spinel crystal structure (for example, Li1+xMn$_2$-xO$_4$), a lithium manganese complex oxide in which some of lithium manganese oxide is substituted or doped with a metal element (for example, Li1+xMyMn$_2$-x-yO$_4$, M represents at least one of Co, Ni, Fe, Cu, Al, Cr, Mg, Zn, V, Ga, B, and F), lithium cobaltate or lithium titanate having a lamellar crystal structure, a lithium-metal complex oxide in which some of the above lithium cobaltate or lithium titanate is substituted or doped with a metal element may be used.

(6) In the above embodiment, an example in which PVDF is used as the binder of the joining agent layers 123 and 125 in the positive electrode plate 122 and the negative electrode plate 124 is shown, but it is possible to use a polymer such as polytetrafluoroethylene (PTFE), polyethylene, polystyrene, polybutadiene, butyl rubber, nitrile rubber, styrene/butadiene rubber, polysulfide rubber, nitrocellulose, cyanoethyl cellulose, a variety of latexes, acrylonitrile, vinyl fluoride, vinilidene fluoride, propylene fluoride, chloroprene fluoride, or an acryl-based resin, a mixture thereof, and the like.

(7) In the above embodiment, an example in which LiPF$_6$ is used as the electrolyte is shown, but the material is not limited thereto, and it is possible to use, for example, LiClO$_4$, LiAsF$_6$, LiBF$_4$, LiB (C$_6$H$_5$)$_4$, CH$_3$SO$_3$Li, CF$_3$SOLi, or the like or a mixture thereof. In addition, in the embodiment, an example in which a solvent mixture of EC and DMC is used as the solvent of the non-aqueous electrolytic solution, but a solvent mixture of at least one of propylene carbonate, ethylene carbonate, dimethyl carbonate, diethyl carbonate, 1,2-dimethoxyethane, 1,2-diethoxyethane, γ-butyrolactone, tetrahydrofuran, 1,3-dioxolane, 4-methyl-1,3-dioxolane, diethyl ether, sulfolane, methyl sulfolane, acetonitrile, propionitrile, and propionitrile may be used, and the mixing ratio is also not specified.

(8) in the embodiment described above, only the separator 121 may be wound on the shaft core 10 one or more circuits in advance so as to secure insulation between the positive electrode shaft core portion 11 and the negative electrode plate 124, and the negative electrode shaft core portion 12 and the positive electrode plate 122, but a separate insulating separator other than the separator 121 may also be wound on the shaft core 10.

(9) In the embodiment described above, the positive and negative electrode collection portions 122A and 124A of the positive and negative electrode plates 122 and 124, and the positive electrode shaft core portion 11 and the negative electrode shaft core portion 12 of the shaft core 10 are joined through ultrasonic welding, but the joining method is not particularly limited as long as the positive and negative electrode collection portions of the positive and negative electrode plates, and the positive electrode shaft core portion and the negative electrode shaft core portion of the shaft core can be electrically joined through resistance welding or other welding method.

(10) In the embodiment described above, the positive electrode shaft core portion 11 of the shaft core 10 and the external positive electrode terminal 113 are electrically connected through the positive electrode collector 115, and the negative electrode shaft core portion 12 of the shaft core 10 and the external negative electrode terminal 114 are electrically connected through the negative electrode collector 116, but the connection structure is not limited to the shapes and structures of the embodiments.

(11) In the above description, the shaft core portions 11 and 12 having the splaying portions 11P and 12N are prepared by folding one piece of the metal materials 11m and 12m, but two pieces of the metal plates may be used.

The above description is an example, and it is possible to apply the invention to square batteries having a variety of structures within the scope of the purport of the invention. Therefore, it is possible to apply the invention to a variety of square batteries having the wound electrode group 120 in which the positive electrode plate 122 on which the positive electrode active material 123 is coated and the negative electrode plate 124 on which the negative electrode active material 125 is coated are wound on the outer circumferential portion of the shaft core 10 through the separator 121, the vessel 71 which accommodates the wound electrode group 120, has the inside sealed with the lid 111, and is provided with the positive electrode external terminal 113 and the negative electrode external terminal 114 on the external surface, the positive electrode collector 115 that electrically connects the positive electrode plate 122 to the positive electrode external terminal 113, the negative electrode collector 116 that electrically connects the negative electrode plate 124 to the negative electrode external terminal 114, and the positive electrode splaying portion 11P and the negative electrode splaying portion 12N that respectively press and splay the laminate 122C of the positive electrode plates 122 and the laminate 124C of the negative electrode plates 124 from inside at both end surfaces of the wound electrode group 120, in which the shaft core 10 includes the positive electrode shaft core portion 11 provided with the positive electrode splaying portion 11P at one end, the negative electrode shaft core portion 12 provided with the negative electrode splaying portion 12N at the other end, and the insulation portion 13 that mutually insulates and integrates the positive electrode shaft core portion 11 and the negative electrode shaft core portion 12, the positive electrode plate 122 is electrically connected to the positive electrode collector 115 in a state of being splayed through the positive electrode splaying portion 11P, and the negative electrode plate 124 is electrically connected to the negative electrode collector 116 in a state of being splayed through the negative electrode splaying portion 12N.

REFERENCE SIGNS LIST

SHAFT CORE
POSITIVE ELECTRODE SHAFT CORE PORTION
11PA: POSITIVE ELECTRODE CUTTING PIECE
12: NEGATIVE ELECTRODE SHAFT CORE PORTION
12N: NEGATIVE ELECTRODE SPLAYING PORTION, NEGATIVE ELECTRODE PROTRUSION
12NA: NEGATIVE ELECTRODE CUTTING PIECE
13: INSULATION PORTION
20: SQUARE BATTERY
71: VESSEL
72: POWER GENERATION ELEMENT ASSEMBLY
110: LID ASSEMBLY
111: LID
113: POSITIVE ELECTRODE EXTERNAL TERMINAL
114: NEGATIVE ELECTRODE EXTERNAL TERMINAL
115: POSITIVE ELECTRODE COLLECTOR
116: NEGATIVE ELECTRODE COLLECTOR
115A, 116A: COLLECTOR BASE PORTION
115B, 116B: COLLECTOR CONNECTION PIECE
115C, 116C: ULTRASONICALLY WELDED SURFACE
120: WOUND ELECTRODE GROUP
121: SEPARATOR

122: POSITIVE ELECTRODE PLATE
122A: POSITIVE ELECTRODE COLLECTING PORTION
122C: POSITIVE ELECTRODE LAMINATE
123: POSITIVE ELECTRODE ACTIVE MATERIAL JOINING AGENT
124: NEGATIVE ELECTRODE PLATE
124A: NEGATIVE ELECTRODE COLLECTING PORTION
124C: NEGATIVE ELECTRODE LAMINATE
125: NEGATIVE ELECTRODE ACTIVE MATERIAL JOINING AGENT

The invention claimed is:

1. A secondary battery comprising:
a wound electrode group configured by winding a positive electrode plate and a negative electrode plate through a separator on an outer circumferential portion of a shaft core;
a vessel which accommodates the wound electrode group, has an inside sealed with a lid, and is provided with a positive electrode external terminal and a negative electrode external terminal on an external surface;
a positive electrode collector that electrically connects the positive electrode plate to the positive electrode external terminal;
a negative electrode collector that electrically connects the negative electrode plate to the negative electrode external terminal;
a positive electrode splaying portion and a negative electrode splaying portion that press and splay a laminate of the positive electrode plate and a laminate of the negative electrode plate from inside at both end surfaces of the wound electrode group,
wherein the shaft core includes a positive electrode shaft core portion provided with the positive electrode splaying portion at one end, a negative electrode shaft core portion provided with the negative electrode splaying portion at the other end, and an insulation portion that mutually insulates and integrates the positive electrode shaft core portion and the negative electrode shaft core portion,
the positive electrode plate is electrically connected to the positive electrode collector in a state of being splayed through the positive electrode splaying portion, and the negative electrode plate is electrically connected to the negative electrode collector in a state of being splayed through the negative electrode splaying portion.

2. The secondary battery according to claim 1,
wherein the positive electrode splaying portion has a pair of folding positive electrode blades, the positive electrode plate is sandwiched and welded between the pair of positive electrode blades that have opened the positive electrode plate wide and the positive electrode collector, and the negative electrode splaying portion has a pair of folding negative electrode blades, and the negative electrode plate is sandwiched and welded between the pair of negative electrode blades that have opened the negative electrode plate wide and the negative electrode collector.

3. The secondary battery according to claim 2,
wherein the positive electrode collector has a pair of two-pronged collector connecting pieces, the positive electrode plate is sandwiched between the pair of positive electrode blades and the pair of collector connecting pieces,
the negative electrode collector has a pair of two-pronged collector connecting pieces, and the negative electrode plate is sandwiched and welded between the pair of negative electrode blades and the pair of collector connecting pieces.

4. The secondary battery according to claim 1,
wherein the insulation portion has a joint portion,
the positive electrode shaft core portion and the negative electrode shaft core portion fold one piece of metal plate and sandwich the joint portion, and the positive electrode shaft core portion and the negative electrode shaft core portion are fixed using an insulating adhesive.

5. The secondary battery according to claim 1,
wherein the positive electrode plate includes metal foil of aluminum or an aluminum alloy, the positive electrode shaft core portion is formed of a metal plate of aluminum or an aluminum alloy,
the negative electrode plate includes metal foil of copper, a copper alloy, nickel, or a nickel alloy, and the negative electrode shaft core portion is formed of a metal plate of copper, a copper alloy, nickel, or a nickel alloy.

6. The secondary battery according to claim 2,
wherein grooves for setting the folding location of the pair of positive electrode blades and the pair of negative electrode blades are formed respectively at base ends of the pair of positive electrode blades and the pair of negative electrode blades.

7. A method of preparing a secondary battery, comprising:
a process in which a positive electrode plate and a negative electrode plate are wound through a separator on a circumferential surface of a shaft core so as to form a wound electrode group in a flat shape;
a process in which a positive electrode shaft core portion provided with a pair of protruding positive electrode blades that press and splay the positive electrode plate on an end surface of the wound electrode group from inside to outside and a negative electrode shaft core portion provided with a pair of protruding negative electrode blades that press and splay a negative electrode plate on an end surface of the flat wound electrode group from inside to outside are integrated through an insulation portion so as to prepare the shaft core;
a process in which the pair of positive electrode blades are splayed so as to press and splay the positive electrode plate on the end surface of the wound electrode group from inside to outside, and the pair of negative electrode blades are splayed so as to press and splay the negative electrode plate on the end surface of the wound electrode group from inside to outside; and
a process in which the pressed-and-splayed positive electrode plate is connected to the positive electrode collector, and the pressed-and-splayed negative electrode plate is connected to the negative electrode collector.

8. The method of preparing a secondary battery according to claim 7,
wherein a process in which the positive and negative electrode plates are connected to the positive and negative electrode collectors includes:
a process in which a laminate of positive electrode bodies is inserted between one of the pair of positive electrode blades and the positive electrode collector, a vibrator and an anvil are located respectively at the outside of the above positive electrode blade and the positive electrode collector so as to carry out a first ultrasonic welding;
a process in which a laminate of positive electrode bodies is inserted between the other one of the pair of positive electrode blades and the positive electrode collector, the vibrator and the anvil are located respectively at the outside of the above positive electrode blade and the positive electrode collector so as to carry out a second ultrasonic welding;

a process in which a laminate of negative electrode bodies is inserted between one of the pair of negative electrode blades and the negative electrode collector, the vibrator and the anvil are located respectively at the outside of the above negative electrode blade and the negative electrode collector so as to carry out a third ultrasonic welding; and a process in which a laminate of negative electrode bodies is inserted between the other one of the pair of negative electrode blades and the negative electrode collector, the vibrator and the anvil are located respectively at the outside of the above negative electrode blade and the negative electrode collector so as to carry out a fourth ultrasonic welding.

* * * * *